US010848511B2

(12) United States Patent
Wang et al.

(10) Patent No.: US 10,848,511 B2
(45) Date of Patent: Nov. 24, 2020

(54) METHOD AND APPARATUS FOR IDENTIFYING FAKE TRAFFIC

(71) Applicant: ALIBABA GROUP HOLDING LIMITED, Grand Cayman (KY)

(72) Inventors: Peng Wang, Hangzhou (CN); Zhongyao Wang, Zhejiang (CN); Xiaoxiao Xu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/271,654

(22) Filed: Feb. 8, 2019

(65) Prior Publication Data

US 2019/0173905 A1  Jun. 6, 2019

Related U.S. Application Data

(63) Continuation of application No. PCT/CN2017/094423, filed on Jul. 26, 2017.

(30) Foreign Application Priority Data

Aug. 8, 2016 (CN) .......................... 2016 1 0645819

(51) Int. Cl.
*H04L 12/26* (2006.01)
*H04L 29/06* (2006.01)
(Continued)

(52) U.S. Cl.
CPC ......... *H04L 63/1425* (2013.01); *G06N 20/00* (2019.01); *H04L 41/14* (2013.01);
(Continued)

(58) Field of Classification Search
CPC . H04L 63/1425; H04L 43/062; H04L 63/102; H04L 63/0236; H04L 41/14; H04L 67/42; H04L 63/1416; G06N 20/00
See application file for complete search history.

(56) References Cited

U.S. PATENT DOCUMENTS 6,321,338 B1 * 11/2001 Porras ................... H04L 41/142
709/224
7,624,447 B1 * 11/2009 Horowitz ............ H04L 63/0263
726/23
(Continued)

FOREIGN PATENT DOCUMENTS

| CN | 102821002 A | 12/2012 |
| CN | 103150506 A | 6/2013 |

(Continued)

OTHER PUBLICATIONS

Doran, Derek, "Detection, Classification, and Workload Analysis of Web Robots" (2014). Doctoral Dissertations. 348. https://opencommons.uconn.edu/dissertations/348.*

(Continued)

*Primary Examiner* — Farid Homayounmehr
*Assistant Examiner* — Zhimei Zhu
(74) *Attorney, Agent, or Firm* — Finnegan, Henderson, Farabow, Garrett & Dunner LLP

(57) ABSTRACT

Embodiments of the disclosure provide methods and apparatuses for identifying fake traffic. The method can includes: collecting access traffic data of network traffic; generating feature data of the access traffic data; and sending the feature data to a server for identifying fake traffic in accordance with the feature data.

17 Claims, 7 Drawing Sheets

(51) Int. Cl.
*G06N 20/00* (2019.01)
*H04L 12/24* (2006.01)
(52) U.S. Cl.
CPC ........ *H04L 43/062* (2013.01); *H04L 63/0236* (2013.01); *H04L 63/102* (2013.01); *H04L 67/42* (2013.01)

(56) References Cited

U.S. PATENT DOCUMENTS

| | | | | |
|---|---|---|---|---|
| 8,402,543 | B1* | 3/2013 | Ranjan | H04L 63/1416 709/223 |
| 8,418,249 | B1* | 4/2013 | Nucci | G06F 21/552 706/20 |
| 8,516,592 | B1* | 8/2013 | Wu | H04L 63/1416 726/12 |
| 8,984,581 | B2* | 3/2015 | Luna | G06F 21/554 726/1 |
| 9,094,288 | B1* | 7/2015 | Nucci | H04L 43/026 |
| 9,288,219 | B2* | 3/2016 | Abuelsaad | H04L 63/1408 |
| 9,344,445 | B2* | 5/2016 | Burns | H04L 63/1441 |
| 2003/0227917 | A1 | 12/2003 | Maher, III et al. | |
| 2005/0021740 | A1* | 1/2005 | Bar | H04L 63/0236 709/224 |
| 2005/0050353 | A1* | 3/2005 | Thiele | G06F 21/554 726/4 |
| 2006/0128406 | A1* | 6/2006 | Macartney | H04L 63/1416 455/466 |
| 2007/0025265 | A1* | 2/2007 | Porras | G06K 7/0008 370/252 |
| 2007/0136783 | A1* | 6/2007 | Shelest | H04L 63/1408 726/1 |
| 2007/0283436 | A1* | 12/2007 | Duffield | H04L 63/1425 726/23 |
| 2008/0080518 | A1* | 4/2008 | Hoeflin | H04L 63/1416 370/395.42 |
| 2008/0101234 | A1* | 5/2008 | Nakil | H04L 63/1425 370/235 |
| 2010/0082513 | A1* | 4/2010 | Liu | H04L 63/1458 706/46 |
| 2011/0055921 | A1* | 3/2011 | Narayanaswamy | H04L 63/1458 726/22 |
| 2012/0233656 | A1* | 9/2012 | Rieschick | H04L 63/1441 726/1 |
| 2013/0104230 | A1* | 4/2013 | Tang | G06F 21/552 726/23 |
| 2013/0152163 | A1* | 6/2013 | Todd | H04L 63/1416 726/1 |
| 2014/0153435 | A1* | 6/2014 | Rolette | H04L 43/028 370/252 |
| 2016/0006753 | A1* | 1/2016 | McDaid | H04L 63/1425 726/23 |
| 2016/0205143 | A1* | 7/2016 | Bryson | H04L 63/205 726/1 |
| 2016/0301703 | A1* | 10/2016 | Aziz | G06F 9/45537 |
| 2016/0359877 | A1* | 12/2016 | Kulshreshtha | G06F 16/173 |
| 2017/0134404 | A1* | 5/2017 | Machlica | H04L 63/1416 |
| 2017/0149804 | A1* | 5/2017 | Kolbitsch | H04L 63/1416 |
| 2017/0223046 | A1* | 8/2017 | Singh | H04L 43/062 |
| 2018/0359268 | A1* | 12/2018 | Shen | H04L 41/142 |
| 2019/0297096 | A1* | 9/2019 | Ahmed | G06N 20/00 |
| 2019/0319979 | A1* | 10/2019 | Gouveia | H04L 63/1408 |

FOREIGN PATENT DOCUMENTS

| | | | |
|---|---|---|---|
| CN | 105119735 A | 12/2015 | |
| CN | 105187392 A * | 12/2015 | ........... H04L 63/145 |
| CN | 105187396 A | 12/2015 | |
| CN | 105554016 A | 5/2016 | |
| CN | 105808639 A | 7/2016 | |
| WO | WO 2018/028430 A1 | 2/2018 | |

OTHER PUBLICATIONS

Li, Wei & Moore, Andrew. (2007). A Machine Learning Approach for Efficient Traffic Classification. 310-317. 15th International Symposium on Modeling, Analysis, and Simulation of Computer and Telecommunication Systems.*
PCT International Search Report issued in International Application No. PCT/CN2017/094423, dated Oct. 26, 2017 (4 pages).
First Chinese Search Report issued in corresponding Chinese Application No. 201610645819.2 dated Feb. 18, 2020 (2 pages).

* cited by examiner

METHOD AND APPARATUS FOR IDENTIFYING FAKE TRAFFIC

CROSS REFERENCE TO RELATED APPLICATION

The disclosure claims the benefits of priority to International Application Number PCT/CN2017/094423, filed Jul. 26, 2017, which claims priority to Chinese Application Number 201610645819.2, filed Aug. 8, 2016, both of which are incorporated herein by reference in their entireties.

BACKGROUND

Requests automatically and frequently sent to a network server through a script program can also be referred to as fake traffic (e.g., machine traffic). The fake traffic produces neither commercial value nor social value, and also brings risks to usability and stability the network server. Therefore, the fake traffic brings inconvenience to normal users' access, and introduces errors to the traffic analysis of the website. Thus, it is necessary to identify fake traffic, so as to control the fake traffic, prevent it from affecting operation of the network, and accordingly ensure normal users' access and better user experience.

Conventionally, fake traffic can be identified as below. A client terminal collects network access traffic data and sends the collected data to a server terminal, and the server determines, according to such traffic data, whether the network traffic is fake traffic.

In one example, the client terminal extracts access content and means related aspects of the collected network access traffic data, such as URL, access time, ip, login id, and the like, and sends the extracted information to the server terminal. The disadvantage of this solution is that, with the development of traffic refreshing technologies, the performance of a script program in terms of access content and means can no longer be distinguished from that of the normal traffic. Therefore, it is difficult for the server terminal to accurately identify fake traffic based on the access content and means.

In another example, the client terminal sends detailed data of the network access traffic to the server terminal. The disadvantage of this example is that, due to the increase in data storage of the network access traffic, the required resources and bandwidth for data transmission are increased, and the higher requirement for bandwidth may even become a bottleneck of processing efficiency.

It can be seen that there are some problems in the existing solutions of fake traffic identification. Therefore, it is necessary to provide a novel solution for identifying fake traffic.

SUMMARY OF THE DISCLOSURE

One of the technical problems solved by the present application is to provide a method, an apparatus and a system for identifying fake traffic, thus realizing accurate identification of fake traffic while reducing the pressure on network transmission.

Embodiments of the disclosure provide a method for identifying fake traffic. The method can include: collecting access traffic data of network traffic; generating feature data of the access traffic data; and sending the feature data to a server for identifying fake traffic in accordance with the feature data.

Embodiments of the disclosure also provide a method for identifying fake traffic. The method can include: receiving, from a client terminal, feature data of access traffic data of network traffic; obtaining an identification result of whether the access traffic data is fake traffic by using a pre-trained fake traffic identification model on the feature data.

Embodiments of the disclosure further provide an apparatus. The apparatus can include: a memory storing a set of instructions; and at least one processor configured to execute the set of instructions to perform: collecting access traffic data of network traffic; generating feature data of the access traffic data; and sending the feature data to a server for identifying fake traffic in accordance with the feature data.

Embodiments of the disclosure further provide an apparatus for identifying fake traffic. The apparatus can include: a memory storing a set of instructions; and at least one processor configured to execute the set of instructions to perform: receiving, from a client terminal, feature data of access traffic data of network traffic; obtaining an identification result of whether the access traffic data is fake traffic by using a pre-trained fake traffic identification model on the feature data.

Embodiments of the disclosure further provide a non-transitory computer readable medium that stores a set of instructions that is executable by at least one processor of a client terminal to cause the client terminal to perform a method for identifying fake traffic. The method can include: collecting access traffic data of access traffic; generating feature data of the network access traffic data; and sending the feature data to a server for identifying fake traffic in accordance with the feature data.

Embodiments of the disclosure further provide a non-transitory computer readable medium that stores a set of instructions that is executable by at least one processor of a server to cause the server to perform a method for identifying fake traffic. The method can include: receiving, from a client terminal, feature data of access traffic data of access traffic; obtaining a server identification result of whether the access traffic data is fake traffic by using a pre-trained fake traffic identification model on the feature data.

Those of ordinary skill in the art will appreciate that, while detailed description will be made below with reference to the illustrated embodiments and accompanying drawings, the present application is not limited to such embodiments only. Rather, the scope of the present application is broad, and is intended to be defined only by the appended claims.

BRIEF DESCRIPTION OF THE DRAWINGS

Other features, objects and advantages of the present application will become more apparent by reading the detailed description of the non-limiting embodiments made with reference to the following drawings, in which.

Figure 1:
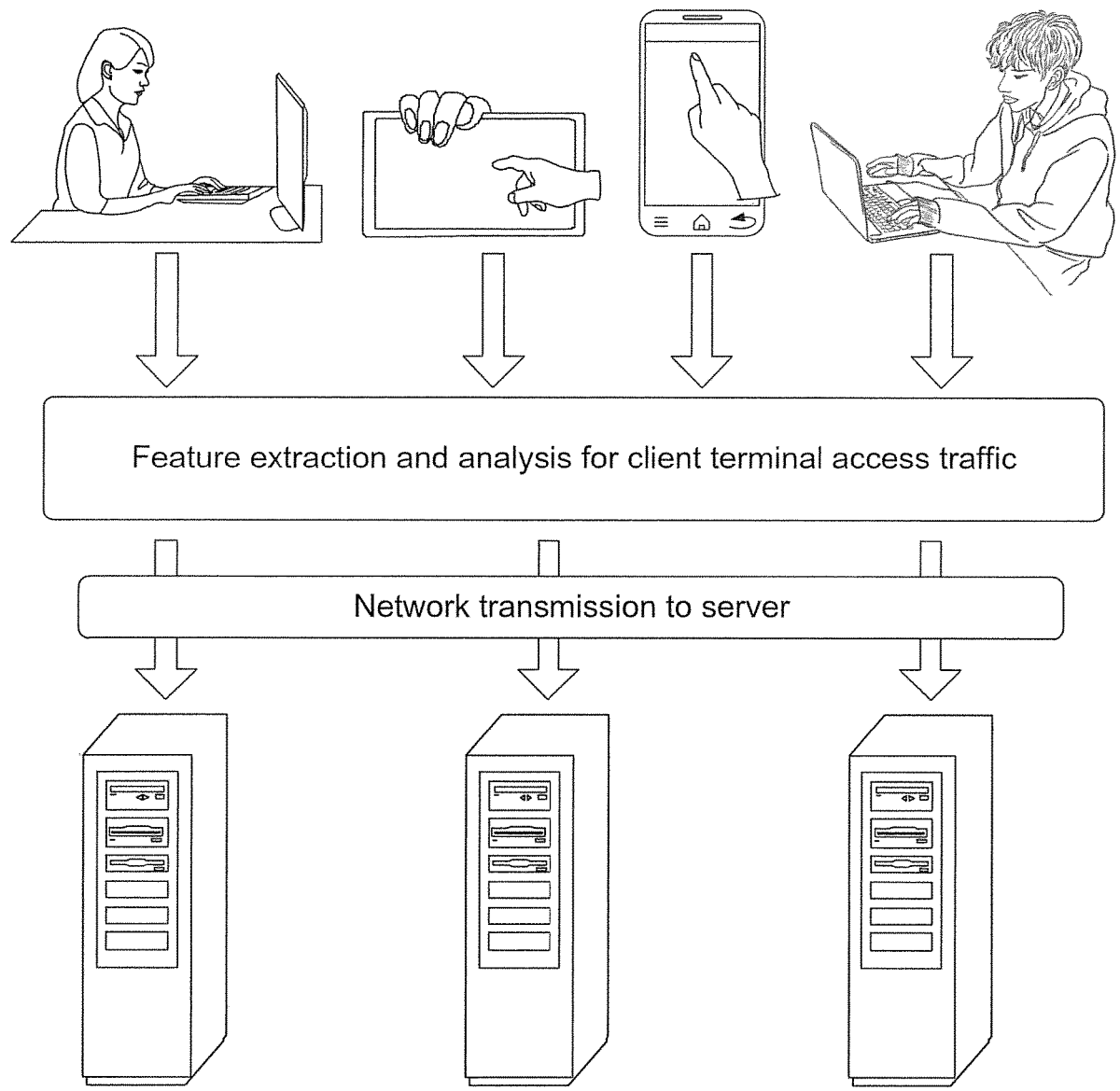
FIG. 1 illustrates an implementation framework diagram for identifying fake traffic according to embodiments of the present application.

Those of ordinary skill in the art will appreciate that, while detailed description will be made below with reference to the illustrated embodiments and accompanying drawings, the present application is not limited to such embodiments only. Rather, the scope of the present application is broad, and is intended to be defined only by the appended claims.

DETAILED DESCRIPTION

Before discussing exemplary embodiments in more detail, it should be noted that some exemplary embodiments are described as processes or methods depicted in the flowcharts. Although the flowcharts describe various operations as sequential processing, many of the operations can be carried out in parallel, concurrently or simultaneously. In addition, the order of various operations can be rearranged. The process may be terminated when its operations are completed, but there may further be additional steps not included in the drawings. The process may correspond to methods, functions, procedures, subroutines, subprograms, and the like.

In the present disclosure, a computer device may be a user device or a network device. A user device includes, but is not limited to, a computer, a smart phone, a PDA, and the like. A network device includes, but is not limited to, a single network server, a server group composed of a plurality of network servers, or a Cloud based on cloud computing and formed by a large number of computers or network servers. Cloud computing is a distributed computing. For example, the cloud computing can be provided by a super virtual computer including a group of loosely coupled computer sets. The computer device may operate separately to implement embodiments of the present disclosure. The computer device may also access a network and implement embodiments the present disclosure by interacting with other computer devices in the network. The network in which the computer device is located includes, but is not limited to, the Internet, a wide area network, a metropolitan area network, a local area network, a VPN network, and the like.

It should be noted that the user device, the network device, the network, and the like are only examples, and other existing or future computer devices or networks, if applicable to the present disclosure, should also be included within the scope of the present application.

The methods discussed later (some of which are illustrated by flowcharts) can be implemented by hardware, software, firmware, middleware, microcode, hardware description languages, or any combination thereof. When implemented by software, firmware, middleware or microcode, the program codes or code segments for carrying out necessary tasks can be stored in a machine or a computer readable medium (such as a storage medium). One or more processors may carry out the necessary tasks.

The specific structural and functional details disclosed herein are merely representative and are for purpose of describing exemplary embodiments of the present disclosure. However, the present disclosure can be implemented in many alternative forms and should not be construed as being limited only to the embodiments set forth herein.

It should be understood that, although the terms "first," "second" and the like may be used herein to describe individual units, these units should not be restricted by these terms. These terms are used only to distinguish one unit from another. By way of example and without departing from the scope of the exemplary embodiments, a first unit may be termed a second unit, and similarly a second unit may be termed a first unit. The term "and/or" used herein includes any and all combinations of one or more associated items listed.

It should be understood that, when a unit is referred to as being "connected" or "coupled" to another unit, it can be directly connected or coupled to the other unit, or there may be intervening units. In contrast, when a unit is referred to as being "directly connected" or "directly coupled" to another unit, there is no intervening unit. Other words used to describe the relationship between units should be interpreted in a similar way (e.g., "between" vs "directly between," "adjacent to" vs "directly adjacent to," and the like).

The terms are used herein only for describing specific embodiments and are not intended to limit the exemplary embodiments. The singular forms "a(n)" and "one" as used herein are intended to include the plural forms as well, unless the context clearly indicates otherwise. It should also be understood that the terms "comprise(include)" and/or "contain" as used herein specify the existence of the stated features, integers, steps, operations, units and/or components, without excluding the existence or addition of one or more other features, integers, steps, operations, units, components and/or combinations thereof.

It should also be noted that, in some alternative implementation manners, the functions/actions mentioned may take place in an order different from that indicated in the drawings. By way of example, depending on the functions/actions involved, two successive drawings can actually be executed essentially at the same time or sometimes can be executed in an opposite order.

The existing technical solutions for identifying fake traffic fail to accurately determine the feature information of the network access traffic data required for the server terminal for identifying the fake traffic. This causes the data volume sent to the server terminal to be insufficient or too large, which may cause the server terminal to fail to accurately identify the fake traffic or to generate pressure on the network transmission, resulting in a performance bottleneck of processing efficiency. To overcome these problems, in embodiments of the present application, the feature data of the network access traffic required for the server terminal to identify the fake traffic can be determined through a machine learning process on off-line big data. The feature data determined by the machine learning process improves the accuracy of the identification of the fake traffic and reduces the data volume transmitted by the client terminal to the server terminal.

The technical solutions of the present application will be further described in detail below with reference to the accompanying drawings.

FIG. 1 illustrates an implementation framework diagram 100 for identifying fake traffic, according to embodiments of the present application. As can be seen from FIG. 1, the client terminal can collect access traffic data of network traffic, and the client terminal includes, but is not limited to: a PC, a PAD, a mobile terminal, and the like. Feature extraction and analysis can be performed out for the collected network traffic data. In some embodiments, the feature data of the access traffic data can be obtained statistically, and then the feature data obtained statistically is transmitted to the server through the network, so that the server identifies fake traffic in accordance with the feature data.

Figure 2:
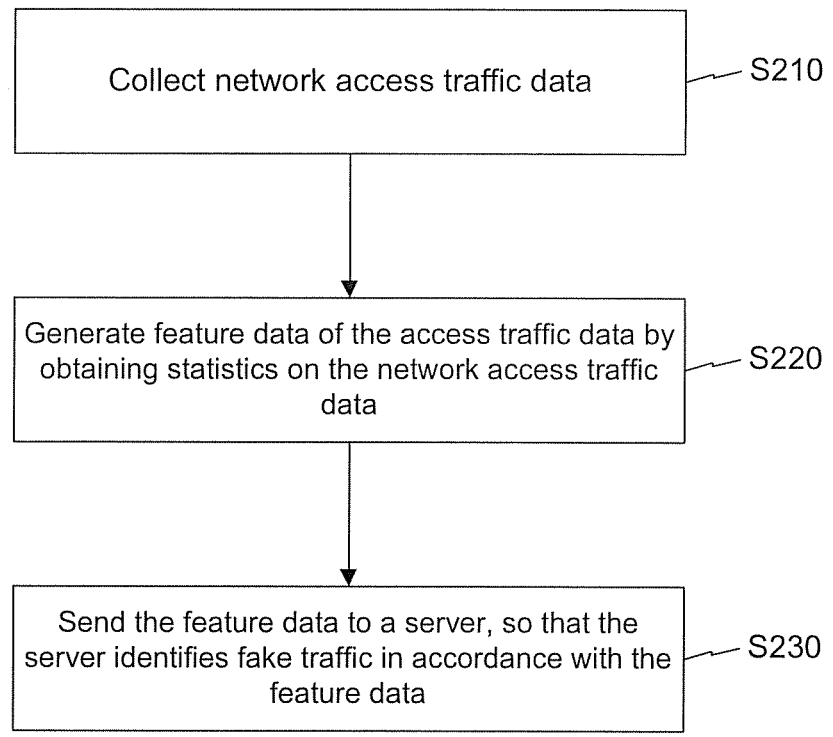
FIG. 2 is a flowchart of a method for facilitating identification of fake traffic, according to embodiments of the present application.

FIG. 2 is a flowchart of a method 200 for facilitating identification of fake traffic according to embodiments of the present disclosure. The method 200 is used by the client terminal to collect feature data required for the server terminal for identifying the fake traffic, and send it to the server terminal, thereby facilitating the server terminal to identify the fake traffic. The method 200 includes the following steps.

In step S210, network access traffic data can be collected.

In step S220, feature data of the access traffic data can be generated by obtaining statistics on the network access traffic data.

In step S230, the feature data can be sent to a server, so that the server identifies fake traffic in accordance with the feature data.

The above steps will be described in further detail below.

In step S210, the network access traffic data can include contents of an accessed website, means utilized to access the website, or user access habit data.

For example, the contents of the accessed website can include the domain names at various levels of the website accessed, the business content contained in the page, the upstream-downstream relationship between accessed pages, and the like.

The means utilized to access the website can include: a personal computer (PC) or a mobile device, an IP (Internet Protocol) address, an MAC (Media Access Control) address, a WIFI (Wireless Fidelity) name, a WIFI MAC address, a Session identity (ID), a login ID, and the like.

The user access habit data can include access time and access duration for each page, content (e.g., a character, a letter, or a word), order of the content, time and keystroke duration of an textbox input, mouse sliding track coordinates and corresponding time during an access, time and amplitude of wheel rolling during an access, amplitude and time of user finger sliding and dragging when using a touchscreen device, and the like.

Using the above user access habit data, the fake traffic can be identified from the user's operations.

In step S220, the feature data can be determined through a machine learning process. The determination of the feature data can include: determining the feature data by performing the machine learning process on the network access traffic data when the server is off-line. Client terminals can extract the feature data from the network access traffic data by e.g., statistical calculation.

In some embodiments, the feature data can include statistics on the number of pages accessed by the user, the number of page turning, and the network IP, MAC address, WIFI MAC, Session ID, and login ID with which the user initiates an access request through the client terminal. The number of pages accessed by the user and the number of page jumps within a time period can be obtained by a statistical approach. For example, the number of pages accessed by the user and the number of page turning within 1 second, 10 seconds, 20 seconds or 1 minute can be determined.

In some embodiments, the feature data can include a distribution of time periods within which the user accesses different types of pages, an average value of the amount of time the user spent on browsing the pages, and a variance of the amount of time the user spent on browsing the page.

In some embodiments, the feature data can include an average value and a variance of time intervals between inputs of successive characters when the user inputs a character string in a textbox, an average value and a variance of keystroke durations when inputting different characters, the keystroke order and time interval when the user inputs a particular combination of characters, and the keystroke duration (the duration of one keystroke).

In some embodiments, the feature data can include the maximum and minimum coordinates of the user's mouse sliding track in both directions of X-axis and Y-axis, the speed of mouse sliding, and a frequency of operations on a screen area where the user operates frequently.

In some embodiments, the feature data can include an average value and a variance of durations of scrolling the mouse wheel by the user, an average value and a variance of intervals between two consecutive scrolling, and an average value and a variance of wheel scrolling distances (e.g., the number of screen lines).

In some embodiments, the feature data can include an average value and a variance of distances (e.g., the number of screen lines) of finger sliding and dragging when the user operates a touchscreen device, an average value and a variance of durations of user finger sliding and dragging to turn to a new page, and an average value and a variance of time intervals between page turning.

It can be seen that, the detailed data of the network access traffic with a larger storage size is converted to the feature data of the access traffic with a smaller storage size. This effectively reduces the requirements on storage and transmission. As the feature data is determined based on machine learning in accordance with the detailed data of the network access traffic, it allows a server terminal to accurately identify whether the access traffic is fake traffic.

It can be understood that the above feature data is exemplary, and embodiments of the present application are not limited thereto. There can be additional features in the feature data, and a machine learning algorithm can decide which feature(s) to use.

In embodiments of the present disclosure, when the machine learning determines the feature data, a subset of feature data of the feature data and a rule corresponding to the subset of feature data may be further determined. For example, the feature data can be weighted, and the subset of feature data can include the feature data having a relatively large weight in the feature data. In some embodiments, the subset of feature data has a great influence on the result of fake traffic identification. The rule may be a threshold range associated with the subset of feature data. For example, the subset of feature data includes: the number of pages accessed by the user, keystroke duration, and the speed of mouse sliding. The rule corresponding to the number of pages accessed by the user may be a threshold of the number of pages accessed by the user in a unit time; the rule corresponding to the keystroke duration may be a threshold of the keystroke duration; and the rule corresponding to the speed of mouse sliding may be a threshold of the speed of mouse sliding. To prevent mis-determination, the threshold corresponding to each rule can be set to avoid mis-preventing normal user access behavior. Therefore, according to the subset of feature data, it is possible to preliminarily identify whether the traffic is fake traffic. The client terminal may store the subset of feature data and the rule associated with the subset of feature data. Thus, after obtaining statistics on the feature data of the network access data, a preliminary identification of fake traffic can be performed on the network access data according to the subset of feature data and the rule, so as to obtain a preliminary identification result. If the preliminary identification result indicates fake traffic, the access traffic can be preliminarily controlled. The preliminary controlling can include: human operation verification, traffic-limiting control, and the like. For example, where the preliminary identification result indicates fake traffic, the identification result is sent to the server, and a verification code returned by the server for human operation verification is received to implement the human operation verification, or the client terminal locally generates a verification code for human operation verification.

In step S230, the feature data can be sent to the server, so that the server identifies fake traffic in accordance with the feature data. The client terminal utilizes the subset of feature data and the rule to perform the fake traffic preliminary identification on the access traffic data. If the preliminary identification result indicates fake traffic, the preliminary identification result can be sent to the server along with the feature data. Also, to reduce the pressure on network transmission, it is possible to send only the preliminary identification result without sending the feature data of the network access traffic preliminarily identified as fake traffic.

In embodiments of the present disclosure, after the feature data is sent to the server, the server can identify whether the network access traffic is fake traffic in accordance with the feature data, and send the identification result to the client terminal. After the client terminal receives the identification result returned by the server regarding whether the access traffic is fake traffic, it can determine whether the preliminary identification result is consistent with the identification result of the server for the network access traffic. For example, the client terminal can determine whether the identification result returned by the server indicates fake traffic. If the identification result of the server indicates no fake traffic, the preliminary control over the access traffic can be released. That is, if the preliminary identification result of the client terminal is inconsistent with the identification result of the server, the preliminary control over the above access traffic can be released. And if the preliminary identification result of the client terminal is consistent with the identification result of the server, the preliminary control over the access traffic can be maintained, and further enforcing control measures may be taken, such as blocking the subsequent access traffic of the device corresponding to the fake traffic.

Additionally, if the received identification result of the server is inconsistent with the preliminary identification result of the client terminal, it shows that the rule corresponding to the applied subset of feature data is not accurate enough. In such a case, the rule corresponding to the subset of feature data can be adjusted. For example, the client terminal may perform a preliminary identification on the access traffic in accordance with the number of pages accessed by the user and the corresponding threshold of the number of pages accessed by the user in unit time, and the preliminary identification result indicates fake traffic. When the received identification result returned by the server indicates no fake traffic, it shows that the threshold of the number of pages accessed by the user in unit time is relatively low, and a normal user access can reach the threshold, thus the threshold of the number of pages accessed by the user in unit time needs to be increased. An adjustment value can be set for the feature parameter in the rule, and the rule can be adjusted according to the adjustment value. For example, the subset of feature data and the feature parameter involved in the preliminary determination of fake traffic can be adjusted. For example, if a preliminary determination carried out according to the subset of feature data is not accurate, the feature parameter corresponding to the subset of feature data may not be used any more.

It can be understood that, for the access traffic for which the preliminary identification result is normal traffic, after the identification result returned by the server is received, it is possible to determine whether it is fake traffic according to the identification result of the server, and further determine whether to control the access traffic.

Figure 3:
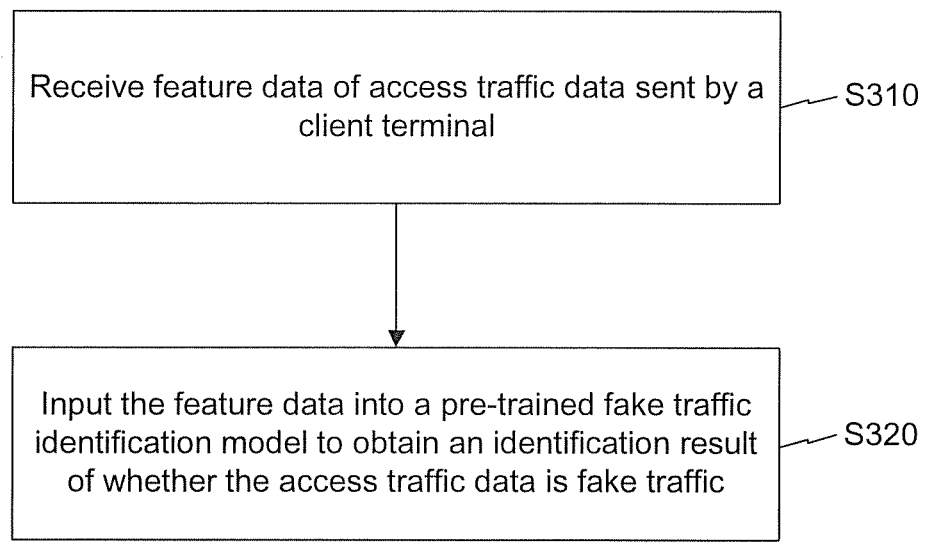
FIG. 3 is a flowchart of a method for identifying fake traffic, according to embodiment of the present application.

FIG. 3 is a flowchart of a method 300 for identifying fake traffic, according to embodiments of the present application. In the method 300, after the server receives the feature data sent by the client terminal, the operation of fake traffic identification is performed in accordance with the feature data. The method 300 includes the following steps.

In step S310, feature data of access traffic data sent by a client terminal can be received.

In step S320, the feature data can be input into a pre-trained fake traffic identification model to obtain an identification result of whether the access traffic data is fake traffic.

The above steps will be described in further detail below.

Figure 4:
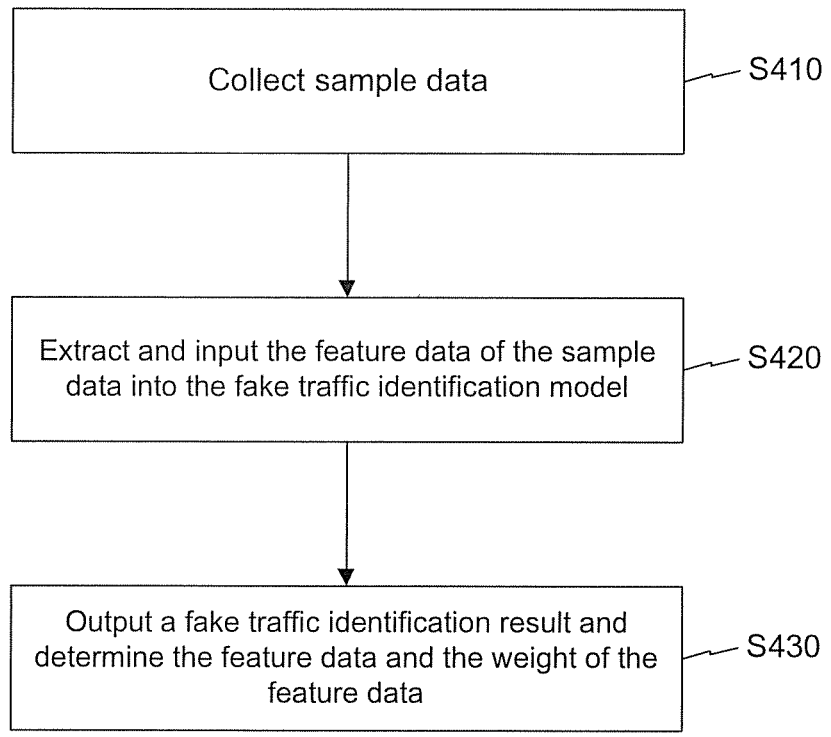
FIG. 4 is a flowchart of a machine learning process, according to embodiments of the disclosure.

In step S310, the feature data can be determined through a machine learning process. The machine learning process can be performed off-line at the server. FIG. 4 is a flowchart of a machine learning process 400, according to embodiments of the disclosure. The machine learning process 400 can include the following steps.

In step S410, sample data can be collected. The prior data determined as fake traffic and the normal access data can be used as sample data. It is appreciated that, with more sample data being collected, the accuracy of the trained model can be higher. In embodiments of the present application, training can be carried out off-line based on a large amount of sample data. Therefore, the feature data required for identifying fake traffic and the weight of feature data can be accurately determined, and the feature data with a relatively great weight can further be determined as the subset of feature data for preliminary determination of fake traffic. For example, the feature data with a weight exceeding a weight threshold can be determined as the subset of feature data. Further, the rule corresponding to the subset of feature data for preliminary determination of fake traffic can be determined. The determined feature data, subset of feature data, and the rule corresponding to the subset of feature data can be sent to the client terminal and stored therein.

In step S420, the feature data of the sample data can be extracted and input into the fake traffic identification model to be trained.

Thus, when the fake traffic identification model is trained, the required feature data can be determined. The weight of the feature data can also be determined through the training process. The feature data can be updated continuously according to the network access traffic taken place, and the fake traffic identification model can be further trained based on the updated feature data.

In step S430, the fake traffic identification model outputs a fake traffic identification result and determines the feature data required by the fake traffic identification model and the weight of feature data. The fake traffic identification result may include a probability that the access traffic is fake traffic. When the probability satisfies a probability threshold, the access traffic may be determined as fake traffic. If the probability threshold is satisfied, the access traffic is determined as fake traffic; otherwise it is not fake traffic.

The description of feature data has been provided above, and the description thereof is omitted herein.

The above feature data determined based on machine learning may include access contents and access means, as well as user's operation behavior habits. The feature data can be used to meet the need for the server terminal to identify fake traffic, and the data volume to be transmitted on the network is reduced.

Referring back to FIG. 3, step S320 is a process for on-line identifying fake traffic based on the feature data received from the client terminal. The feature data is input into the off-line trained fake traffic identification model to obtain an identification result of whether the access traffic data is fake traffic.

The server terminal can locally store the feature data for which the identification result indicates fake traffic, so as to carry out corresponding control according to the subsequent access traffic of the device corresponding to the fake traffic. The control includes multifactor authentication, traffic-limiting control, and blocking. In some embodiments, the server terminal can send the identification result to the client terminal, so that the client terminal controls the access traffic according to the identification result.

In embodiments of the present disclosure, the feature data of the access traffic for the client terminal can be sent to the server terminal. Therefore, the server terminal can receive the feature data (including the feature data of the access traffic for which the preliminary identification result indicates fake traffic) of the access traffic. The identification result can be sent to the client terminal, so that the client terminal controls the access traffic or releases the preliminary control according to the identification result. The identification results, including that the identification result is normal traffic or the identification result is fake traffic, are sent to the client terminal.

In some embodiments, the server terminal receives the feature data, including the subset of feature data for which the preliminary identification result indicates fake traffic, of the access traffic and receives the preliminary identification result at substantially the same time. After the identification result is obtained, the identification result can be compared with the preliminary identification result received from the client terminal. If the identification result is not consistent with the preliminary identification result received from the client terminal, the identification result can be sent to the client terminal. In some embodiments, the client terminal only sends the preliminary identification result which indicates fake traffic to the server. After obtaining the preliminary identification result indicating fake traffic, the server terminal can determine whether the identification result of the server also indicates fake traffic. If it indicates fake traffic, the identification result may not be sent as the client terminal has already preliminarily controlled the fake traffic. If the identification result indicates no fake traffic, it shows that there is a mis-determination in the preliminary identification of the client terminal, then the identification result can be sent to the client terminal to release the preliminary control. This not only realizes the timely control over fake traffic but also effectively avoids mis-determinations. Therefore, in some embodiments, after the preliminary identification result of the preliminary identification is received, the identification result of the fake traffic identification model can be compared with the preliminary identification result to see whether they are consistent, and if they are not consistent, the identification result can be sent to the client terminal.

In some embodiments, when the identification result of the fake traffic identification model is inconsistent with the preliminary identification result, the rule corresponding to the subset of feature data for preliminary determination of fake traffic may be adjusted. And the adjusted rule can be sent to the client terminal. The adjustment value and the feature parameter of the rule can be preset, and the rule can be adjusted by adjusting the value of the feature parameter.

In some embodiments, the client terminal only sends the feature data corresponding to the case that the preliminary identification result is normal traffic to the server terminal, and the server terminal can send only the identification result of the fake traffic to the client terminal after the identification result is obtained. When the preliminary identification result indicates fake traffic, the client terminal can store the identification result, and control the subsequent traffic of the device corresponding to the fake traffic. Therefore, the preliminary identification result of the client terminal can be directly accepted by the client terminal.

Figure 5:
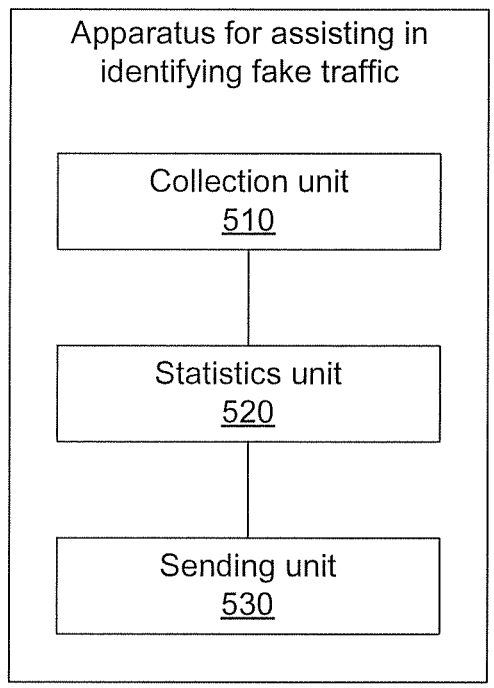
FIG. 5 illustrates a block diagram of an apparatus for facilitating identification of fake traffic, according to embodiments of the present application.

Embodiments of the present disclosure further provide an apparatus for facilitating identification of fake traffic. FIG. 5 illustrates a block of an apparatus 500 for facilitating identification of fake traffic, according to embodiments of the present disclosure. The apparatus 500 can include a collection unit 510, a statistics unit 520, a sending unit 530.

The collection unit 510 can be configured to collect network access traffic data.

The statistics unit 520 can be configured to obtain statistics on the feature data of the access traffic data; the feature data is determined through a machine learning process.

The sending unit 530 can be configured to send the feature data to a server, so that the server identifies fake traffic in accordance with the feature data.

In some embodiments, the apparatus 500 can further include a preliminary identification unit 540 and a preliminary control unit 550 (not shown).

The preliminary identification unit 540 can be configured to perform a preliminary identification of fake traffic on the access traffic data according to a subset of feature data in the feature data and a rule corresponding to the subset of feature data, to obtain a preliminary identification result.

The preliminary control unit 550 can be configured to preliminarily control the access traffic if the preliminary identification result indicates fake traffic.

In some embodiments, the apparatus 500 can further include a receiving unit 560, a determination unit 570, a releasing unit 580 (not shown).

The receiving unit 560 can be configured to receive the identification result, returned by the server, of whether the access traffic is fake traffic.

The determination unit 570 can be configured to determine whether the identification result, returned by the server corresponding to the access traffic for which the preliminary identification result indicates fake traffic, indicates fake traffic;

The releasing unit 580 can be configured to release the preliminary control for the access traffic if the determination unit determines that the identification result indicates no fake traffic.

In some embodiments, the apparatus 500 can further include: an adjustment unit 590 and a preliminary identification result sending unit 5110 (not shown).

The adjustment unit 590 can be configured to adjust the rule corresponding to the subset of feature data if the determination unit 590 determines that the identification result indicates no fake traffic.

The preliminary identification result sending unit 5110 can be configured to send the preliminary identification result which indicates fake traffic to the server.

Figure 6:
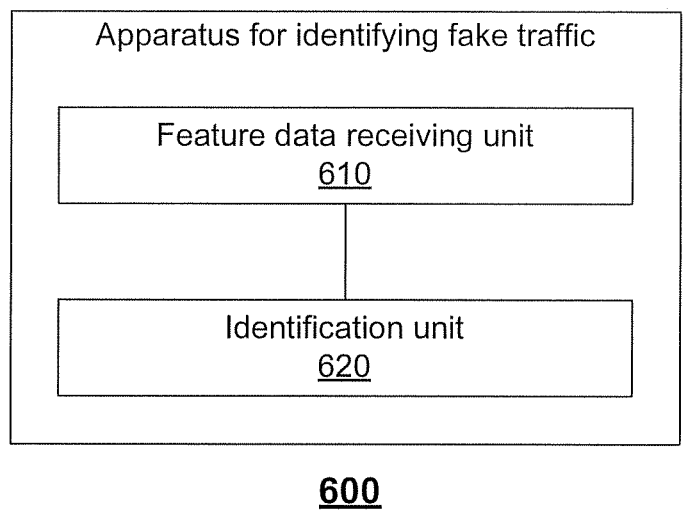
FIG. 6 illustrates a block diagram of an apparatus for identifying fake traffic, according to embodiments of the present application.

Embodiments of the present disclosure further provide an apparatus 600 for identifying fake traffic. FIG. 6 illustrates a block diagram of an apparatus 600 for identifying fake traffic, according to embodiments of the present disclosure. The apparatus 600 can include a feature data receiving unit 610 and an identification unit 620.

The feature data receiving unit 610 can be configured to receive the feature data of access traffic data sent by the client terminal. In some embodiments, the feature data is determined through a machine learning process.

The identification unit 620 can be configured to input the feature data into a pre-trained fake traffic identification model to obtain an identification result of whether the access traffic data is fake traffic.

The identification result can include a probability of identifying the access traffic data as fake traffic.

In some embodiments, the apparatus 600 can further include a sending unit 630 configured to send the identification result to the client terminal.

In some embodiments, the apparatus 600 further include: a preliminary identification result receiving unit 640, a comparison unit 650, an adjustment unit 660, and a rule sending unit 670.

The preliminary identification result receiving unit 640 can be configured to receive the preliminary identification result, sent by the client terminal, of the fake traffic preliminary identification performed on the access traffic data according to the subset of feature data in the feature data and the rule corresponding to the subset of feature data.

The comparison unit 450 can be configured to compare the identification result of the fake traffic identification model with the preliminary identification result to check whether they are consistent.

The adjustment unit 460 can be configured to adjust the rule corresponding to the subset of feature data if the identification result of the fake traffic identification model is inconsistent with the preliminary identification result.

The rule sending unit 470 can be configured to send the adjusted rule corresponding to the subset of feature data to the client terminal.

Figure 7:
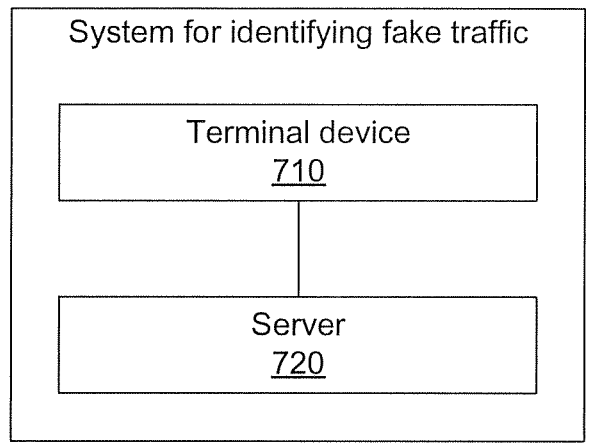
FIG. 7 illustrates a block diagram of a system for identifying fake traffic, according to embodiments of the present application.

FIG. 7 illustrates a block diagram of a system 700 for identifying fake traffic, according to embodiment of the present disclosure. The system 700 can include: a terminal device 710 and a server 720.

The terminal device 710 can be configured to collect network access traffic data, obtain statistics on feature data of the access traffic data, and send the feature data to a server, so that the server identifies fake traffic in accordance with the feature data.

The server 720 can be configured to receive the feature data of the access traffic data sent by a client terminal, and input the feature data into a pre-trained fake traffic identification model to obtain an identification result of whether the access traffic data is fake traffic.

In some embodiments, the feature data for identifying the fake traffic can be pre-determined. For example, the client terminal collects the network access traffic data, obtain statistics on the feature data of the network access traffic, and sends it to the server terminal. The feature data can be obtained by the client terminal through statistical calculation based on the collected access traffic data, instead of the detailed data of the access traffic. In doing so, fake traffic can be identified accurately while the data volume transmitted by the client terminal to the server terminal can be reduced, thereby reducing the required storage and transmission.

It is appreciated that embodiments of the present disclosure can be implemented in software and/or a combination of software and hardware. For example, embodiments of the present disclosure can be implemented by using an application specific integrated circuit (ASIC), a general-purpose computer, or any other similar hardware equipment. In an embodiment, a software program of the present application can be executed by a processor to implement the steps or functions described above. Likewise, a software program (including related data structures) of the present application can be stored in a computer readable recording medium, such as a RAM memory, a magnetic or optical drive or a floppy disk and similar devices. Additionally, some steps or functions of the present disclosure can be implemented by using hardware, for example, a circuit that cooperates with a processor to perform various steps or functions.

Additionally, a part of the present disclosure can be applied as a computer program product, such as computer program instructions, which, when executed by a computer, can invoke or provide the method and/or technical solution according to the present disclosure through operations of the computer. The program instructions that invoke the method of the present application may be stored in a fixed or mobile recording medium, and/or transmitted through broadcastings or data streams in other signal carrier media, and/or stored in a memory of a computer device that runs according to the program instructions. Herein, an embodiment according to the present disclosure includes an apparatus. The apparatus includes a storage device configured to store computer program instructions and processor(s) configured to execute the program instructions. When the computer program instructions are executed by the processor(s), the apparatus is triggered to run the method and/or technical solution based on various aforementioned embodiments according to the present disclosure.

It is apparent to those skilled in the art that the present disclosure is not limited to the details of the aforementioned exemplary embodiments, and embodiments of the present disclosure can be implemented in other specific forms without departing from the spirit or essential characteristics of the present disclosure. Therefore, the embodiments should be considered as exemplary and nonrestrictive in all respects, and the scope of the present disclosure is defined by the appended claims rather than the above description. Thus, the present disclosure is intended to cover all modifications that fall within the meaning and scope of the equivalent elements of the claims. Any reference signs in the claims should not be regarded as limiting the involved claims. In addition, it is apparent that the term "comprise (include)" does not exclude other units or steps, and a singular form does not exclude a plural form. Multiple units or apparatuses stated in a system claim may also be implemented by one unit or apparatus through software or hardware. The words such as "first," "second," and the like are used to represent names, and do not represent any particular order.

What is claimed is:

1. A method for identifying fake traffic, comprising:
   collecting access traffic data of network traffic;
   generating, by a client terminal, feature data of the collected access traffic data, the feature data being associated with user access behavior;
   obtaining, by the client terminal, a first identification result indicating whether the access traffic data contains fake traffic based on a subset of the feature data, the subset of the feature data determined for identifying fake traffic;

in response to the first identification result indicating that the access traffic data contains fake traffic, performing, by the client terminal, an access traffic control on the network traffic;

sending, in response to the first identification result indicating fake traffic, the feature data to a server for obtaining, from the server, a second identification result indicating whether the access traffic data contains fake traffic in accordance with the feature data; and in response to the second identification result by the server indicating that the access traffic data does not contain fake traffic, releasing, by the client terminal, the access traffic control of the network traffic.

2. The method of claim 1, wherein obtaining, by the client terminal, the first identification result comprises:
determining the subset of feature data based on the feature data;
determining a rule corresponding to the subset of feature data; and
obtaining the first identification result of the access traffic data according to the subset of feature data and the rule.

3. The method of claim 2, further comprising:
adjusting the rule corresponding to the subset of feature data in response to a determination of the access traffic not being fake traffic.

4. The method of claim 2, wherein the rule comprises: a threshold range corresponding to the subset of feature data and a feature parameter.

5. The method of claim 2, further comprising:
sending the first identification result to the server in response to the first identification result indicating fake traffic.

6. The method of claim 1, further comprising:
training a machine learning model off-line by using prior traffic data determined as fake traffic and feature data of the prior traffic data.

7. The method of claim 1, wherein the collected access traffic data comprises at least one of contents of an accessed website, means utilized to access the website, or user access habit data.

8. The method of claim 7, wherein
the contents of the accessed website by a user comprises at least one of a number of accessed pages and a number of page turning during a predetermined time period;
the means utilized to access the website comprises an IP (Internet Protocol) address, an MAC (Media Access Control) address, a WIFI (Wireless Fidelity) name, a WIFI MAC address, a Session identity (ID), or a login ID; and
the user access habit data comprises at least one of time periods during which the user accesses different types of pages, an average value of page access durations, and a variance of the page access durations.

9. An apparatus comprising:
a memory storing a set of instructions; and
at least one processor configured to execute the set of instructions to perform:
collecting access traffic data of network traffic;
generating, by a client terminal, feature data of the collected access traffic data, the feature data being associated with user access behavior;
obtaining, by the client terminal, a first identification result indicating whether the access traffic data contains fake traffic based on a subset of the feature data, the subset of the feature data determined for identifying fake traffic;

in response to the first identification result indicating that the access traffic data contains fake traffic, performing, by the client terminal, an access traffic control on the network traffic;

sending, in response to the first identification result indicating fake traffic, the feature data to a server for obtaining, from the server, a second identification result indicating whether the access traffic data contains fake traffic in accordance with the feature data; and in response to the second identification result by the server indicating that the access traffic data does not contain fake traffic, releasing, by the client terminal, the access traffic control of the network traffic.

10. A non-transitory computer readable medium that stores a set of instructions that is executable by at least one processor of a client terminal to cause the client terminal to perform a method for identifying fake traffic, the method comprising:
collecting access traffic data of network access traffic;
generating, by a client terminal, feature data of the collected access traffic data, the feature data being associated with user access behaviors;
generating, by a client terminal, feature data of the collected access traffic data, the feature data being associated with user access behavior;
obtaining, by the client terminal, a first identification result indicating whether the access traffic data contains fake traffic based on a subset of the feature data, the subset of the feature data determined for identifying fake traffic;
in response to a determination by the client terminal that the access traffic data contains fake traffic, performing, by the client terminal, an access traffic control on the network traffic;
sending the feature data to a server for obtaining, from the server, a second identification result indicating whether the access traffic data contains fake traffic in accordance with the feature data; and
in response to a determination by the server that the access traffic data does not contain fake traffic, releasing, by the client terminal, the access traffic control of the network traffic.

11. The non-transitory computer readable medium of claim 10, wherein obtaining, by the client terminal, the first identification result comprises:
determining the subset of feature data based on the feature data;
determining a rule corresponding to the subset of feature data; and
obtaining the first identification result of the access traffic data according to the subset of feature data and the rule.

12. The non-transitory computer readable medium of claim 11, wherein in response to the determination of access traffic being not fake traffic, the set of instructions is executable by the at least one processor of the client terminal to cause the client terminal to further perform:
adjusting the rule corresponding to the subset of feature data.

13. The non-transitory computer readable medium of claim 11, wherein the rule comprises: a threshold range corresponding to the subset of feature data and a feature parameter.

14. The non-transitory computer readable medium of claim 11, wherein in response to the first identification result indicating fake traffic, the set of instructions is executable by the at least one processor of the client terminal to cause the client terminal to further perform:
sending the client identification result to the server.

15. The non-transitory computer readable medium of claim 10, wherein the set of instructions is executable by the at least one processor of the client terminal to cause the client terminal to further perform:
training a machine learning model off-line by using prior traffic data determined as fake traffic and feature data of the prior traffic data.

16. The non-transitory computer readable medium of claim 10, wherein the collected access traffic data comprises at least one of contents of an accessed website, means utilized to access the website, or user access habit data.

17. The non-transitory computer readable medium of claim 16, wherein
the contents of the accessed website by a user comprises at least one of a number of accessed pages and a number of page turning during a predetermined time period;
the means utilized to access the website comprises an IP (Internet Protocol) address, an MAC (Media Access Control) address, a WIFI (Wireless Fidelity) name, a WIFI MAC address, a Session identity (ID), or a login ID; and
the user access habit data comprises at least one of time periods during which the user accesses different types of pages, an average value of page access durations, and a variance of the page access durations.

* * * * *